United States Patent [19]

Klingler

[11] Patent Number: 5,774,708
[45] Date of Patent: Jun. 30, 1998

[54] METHOD TO TEST THE RUNNING OF A PROGRAM OF INSTRUCTIONS CARRIED OUT BY AN ASIC AND ASIC PERTAINING THERETO

[75] Inventor: Stéphan Klingler, St-Egreve, France

[73] Assignee: SGS-Thomson Microelectronics, S.A., France

[21] Appl. No.: 935,522

[22] Filed: Sep. 23, 1997

Related U.S. Application Data

[63] Continuation of Ser. No. 443,815, May 18, 1995, abandoned.

[30] Foreign Application Priority Data

May 20, 1994 [FR] France .................................. 94 06492

[51] Int. Cl.[6] .............................. G06F 11/00; G06F 11/22
[52] U.S. Cl. .................... 395/568; 395/183.06; 395/500; 395/561; 364/579; 364/580; 371/10.2; 371/22.31; 371/22.32; 371/22.35
[58] Field of Search .............................. 395/183.06, 500, 395/561, 568; 364/578, 579, 580; 371/10.2, 22.1, 22.31, 22.32, 22.35, 25.1

[56] References Cited

U.S. PATENT DOCUMENTS

| | | |
|---|---|---|
| 4,910,734 | 3/1990 | Segawa et al. ...................... 371/22.31 |
| 5,115,435 | 5/1992 | Langford, II et al. ................ 371/22.32 |
| 5,309,444 | 5/1994 | Dartois et al. .......................... 371/10.2 |
| 5,515,382 | 5/1996 | Lassorie ................................ 371/22.35 |

FOREIGN PATENT DOCUMENTS 0516172  12/1992  European Pat. Off. ........ G06F 11/00

OTHER PUBLICATIONS

Ken Marrin, "Development Tools Engage Mainstream Designers," Computer Design, vol. 32, No. 1, Jan. 1993, pp. 65–74.

J. A. Kiselak et al., "Microprogram Trace Facility," IBM Technical Disclosure Bulletin, vol. 22, No. 88, Jan. 1980, pp. 3780–3781.

*Primary Examiner*—Parshotam S. Lall
*Assistant Examiner*—Bharat Barot
*Attorney, Agent, or Firm*—Michael J. Buchenhorner; Gunster, Yoakley, Valdes-Fauli & Stewart

[57] ABSTRACT

A method and apparatus to test the running of a program of instructions encoded on one or more words, carried out by an integrated circuit, the program being contained in a memory connected to a central processing unit by means of an instruction address bus. A stack of registers is formed and this stack is connected to the instruction address bus in such a way that the address of the first word of each instruction carried out is stored in the stack at the time when it is carried out.

22 Claims, 5 Drawing Sheets

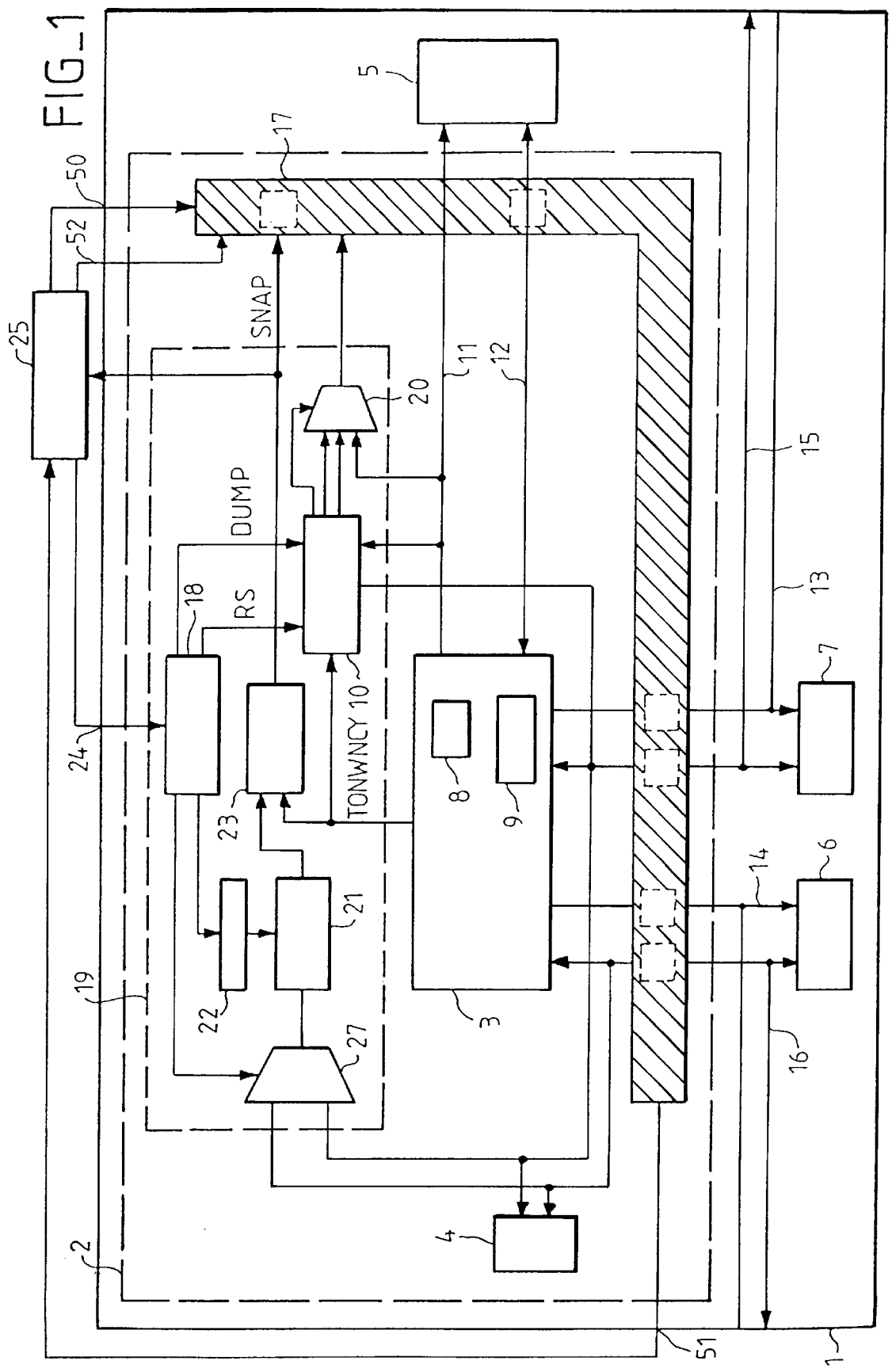
FIG_1

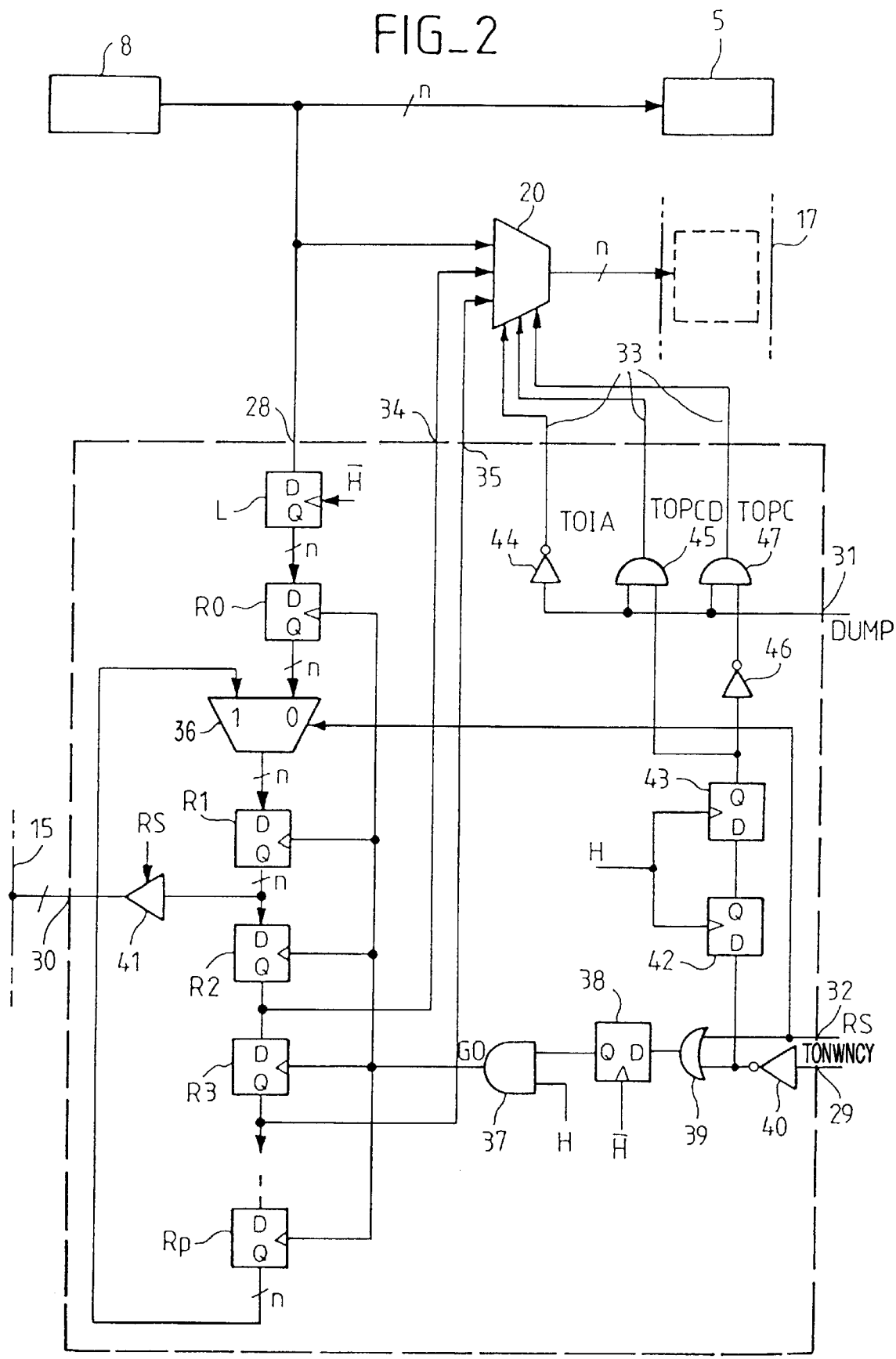
FIG_2

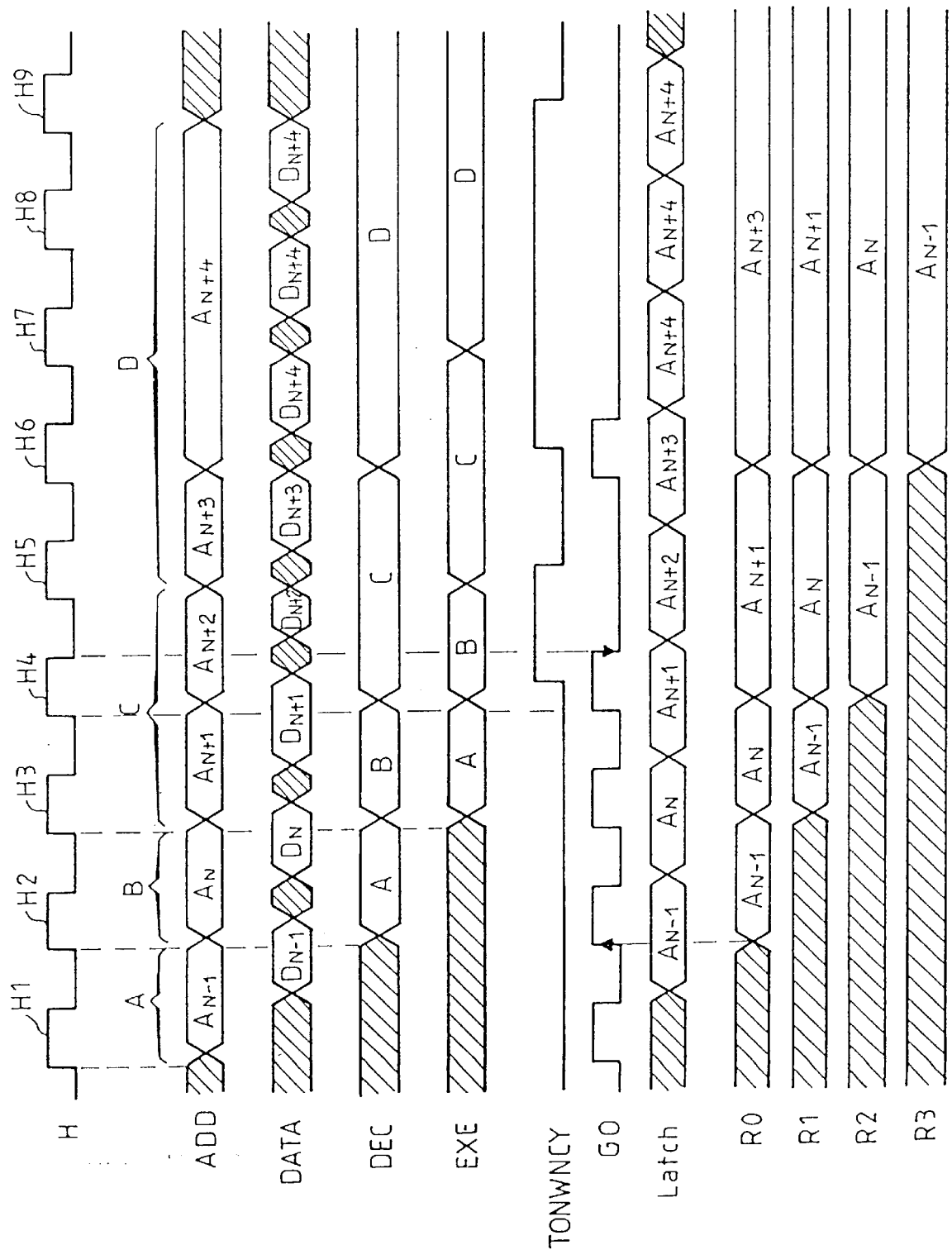
FIG_3

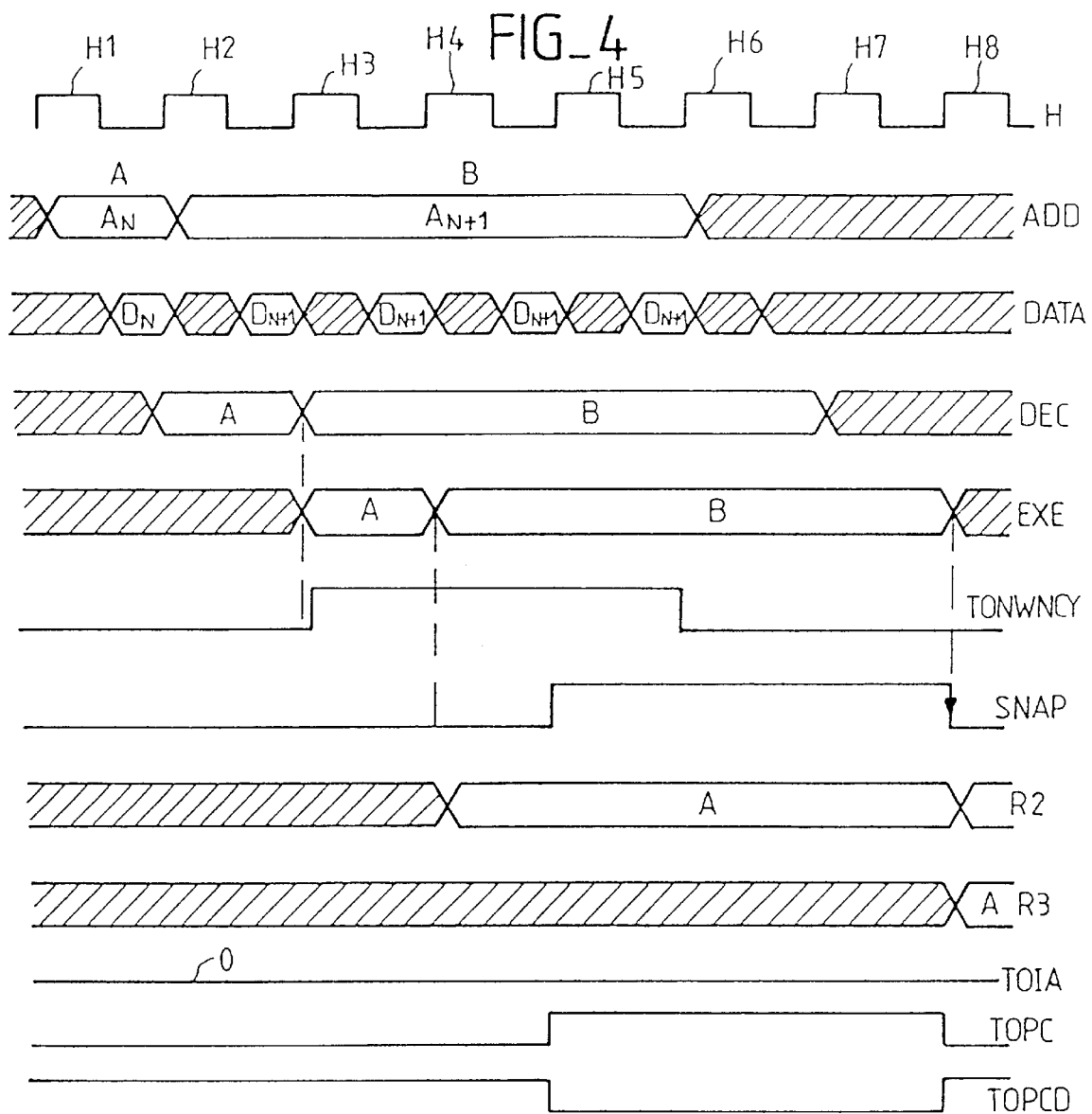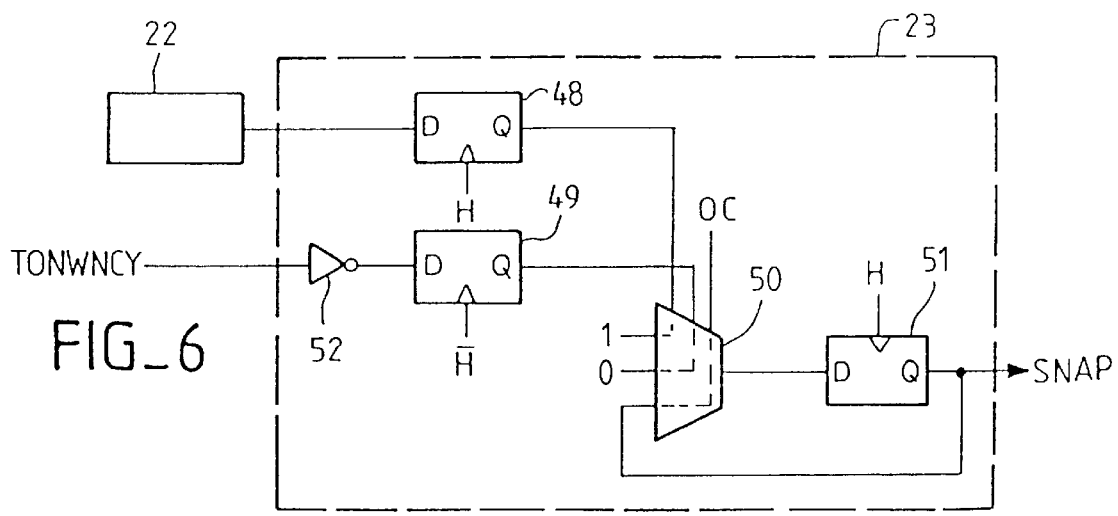

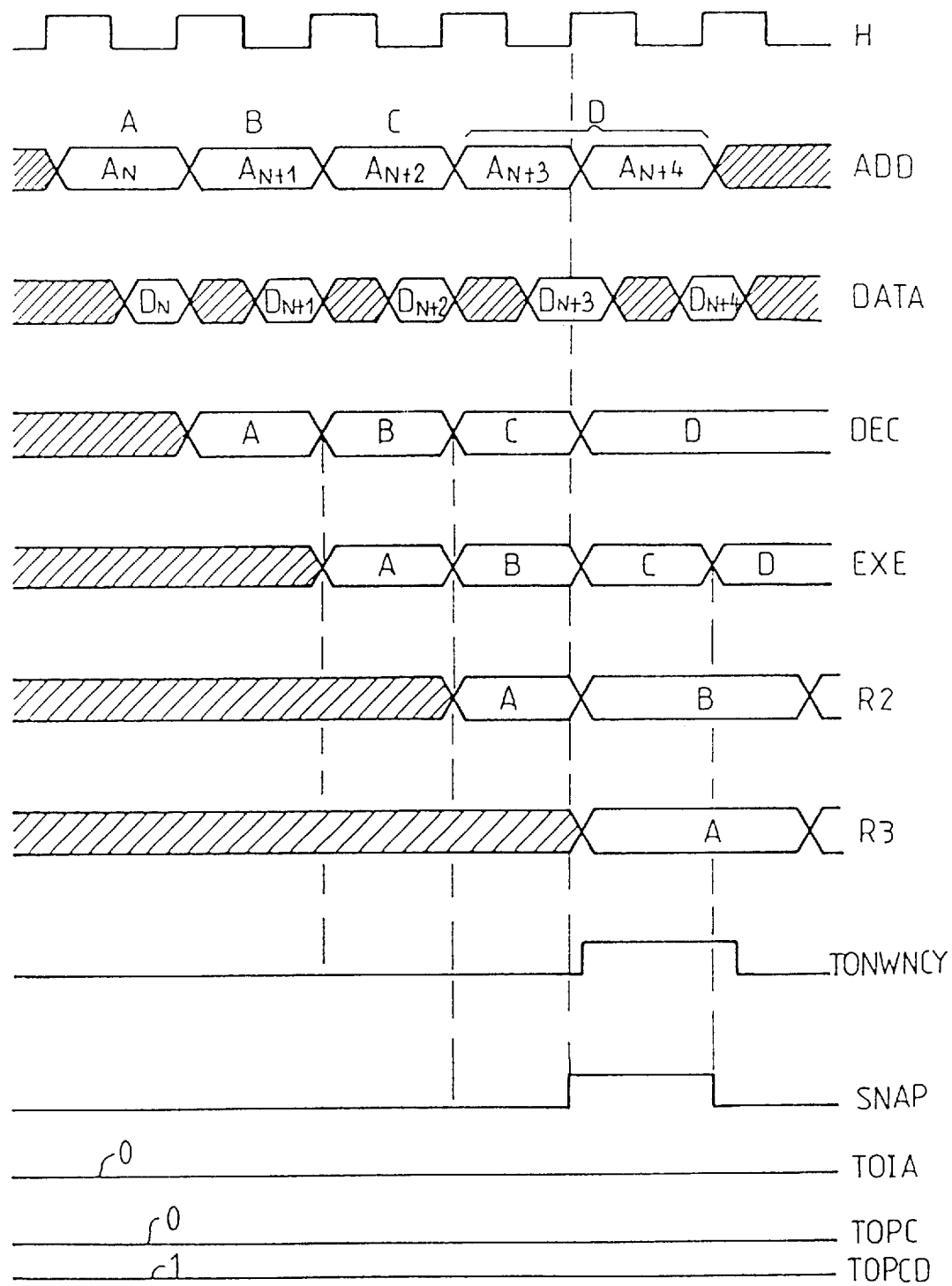

METHOD TO TEST THE RUNNING OF A PROGRAM OF INSTRUCTIONS CARRIED OUT BY AN ASIC AND ASIC PERTAINING THERETO

This application is a continuation of application Ser. No. 08/443,815, filed May. 18, 1995 and now abandoned.

BACKGROUND OF THE INVENTION

1. Field of the Invention

The invention relates to a method for testing the running or progress of a program of instructions carried out by an applications specific integrated circuit, as well as an applications specific integrated circuit designed for the implementation of this method.

Applications specific integrated circuits (ASICs) are integrated circuits made on a single chip at the user's request.

Certain ASICs have a central processing unit (for example a dedicated signal processor or DSP) associated with a certain number of devices depending on the application of the circuit, for example memories, interfaces, etc.

The user gives the manufacturer the application program of the circuit and information on the desired circuit configuration such as information relating to the type and volume of the useful memories or the nature of the interface devices of the circuit. This integrated circuit is then made on a chip by the association, with the central processing unit, of the specified devices, notably a read-only memory (ROM) containing the application program.

Once the silicon chip forming the specialized circuit has been made, different tests have to be applied to it to ascertain that it works properly. Usually, the manufacturer of the circuit tests the constitution of the circuit (namely the characteristics of the component, its connections, etc.) and the user tests his application program or the way in which the circuit performs this program.

2. Description of the Prior Art

With regard to the running of the program, the integrated circuits generally implement a so-called pipeline principle.

To carry out an instruction, it is necessary to position the address or the addresses of the words forming this instruction on an instruction address bus connecting the central processing unit to the memory containing the program in which this instruction Lakes position. A word corresponds to the contents of a basic location of the memory. If an instruction is encoded on one word, it necessitates one access to the memory. If an instruction is encoded on several words, it necessitates several operations of access to the memory before being carried out. When an address is positioned on the address bus, the memory reads the corresponding location corresponding to this address and places the contents of the address or word on a data bus connecting the memory to the central processing unit. The contents of the address are decoded by the central processing unit and then the instruction is carried out if all the words encoding the instruction have been decoded. The pipeline structure consists in placing the addresses on the instruction address bus at the same time as the words corresponding to the previous addresses are decoded and at the same time as the instructions corresponding to the previously decoded words are performed. Thus, a fast running of the program is permitted since the addressing, decoding and performance are done in parallel.

One problem related to pipeline functioning is that it does not provide for precise knowledge of the running of the program since, even if the instruction address bus is accessible from the exterior of the circuit, the addresses present on the bus correspond to instructions that will have to be carried out without any knowledge of what has prompted the positioning of these addresses on the bus (for example, this positioning may be prompted by various instructions located at different places of the program).

SUMMARY OF THE INVENTION

In view of the above, the aim of the present invention is to propose a method to test the running of a program of instructions carried out by an applications specific integrated circuit.

The invention thus proposes a method to test the running of a program of instructions carried out by an applications specific integrated circuit comprising a central processing unit and devices dependent on the application of the circuit, these devices comprising at least one program memory comprising a program of instructions to be carried out, each instruction comprising one or more words and lasting one or more cycles, each word being stored at a location of the memory, the processing of an instruction being successively characterized by:
the positioning, by a program counter, of the address of the word or of the successive addresses of the words of the instruction on an n-bit instruction address bus, n being an integer, connecting the central processing unit to the program memory,
the positioning, by the program memory, after the reading of each word, of this word on an instruction data bus connecting the central processing unit to the memory,
the decoding of the words by a sequencer of the central processing unit,
and the carrying out of the instruction by the central processing unit
wherein, for each instruction, the address of a word of this instruction is stored in the integrated circuit during the processing of the instruction.

Thus, the method provides for retaining an information element on the running of the program, in overcoming the effects of the volatile nature of the addresses placed on the instruction address bus. Furthermore, irrespectively of the number of words encoding the instructions performed, the format of the information stored is identical for all the instructions.

In a preferred version, the address of the word to be stored is stored at the time of the performance of the instruction that the address is representative of.

In this way, it is only the useful addresses that are stored, namely the addresses of instructions for which it is certain that they have produced an effect in the integrated circuit, this effect being for example the positioning of an address on the instruction address bus.

preferably, the address stored is the address of the first word of the instruction.

This therefore removes the need to have knowledge of the number of clock cycles required for the processing of the words (indeed, words may require several clock cycles for their decoding for example).

preferably, the address is stored in one register among p parallel-parallel registers with n inputs and n outputs, with p as an integer, series-connected so as to form a stack and connected to the address bus by means of n latch circuits and one stack input parallel-parallel register with n inputs and n outputs.

Thus, it is simply the addresses of the first words of the instructions carried out that are stored. Providing for the storage of the address of only one word per instruction averts the drawback of filling the stack with different addresses representing only one instruction with several words. This would not provide any fuller information and would not make it possible, for an equal stack size, to have equally precise knowledge of the running of the program.

A second aspect of the invention is an applications specific integrated circuit comprising a central processing unit and devices dependent on the application of the circuit, these devices comprising at least one program memory comprising a program of instructions to be carried out, each instruction comprising one or more words and lasting one or more cycles, each word being stored at a location of the memory, the processing of an instruction being characterized successively by:
the positioning, by a program counter, of the address of the word or of the successive addresses of the words of the instruction on an n-bit instruction address bus, n being an integer, connecting the central processing unit to the program memory,
the positioning, by the program memory, after the reading of each word, of this word on an instruction data bus connecting the central processing unit to the memory,
the decoding of the words by a sequencer of the central processing unit,
and the carrying out of the instruction by the central processing unit
wherein the integrated circuit comprises storage means arranged for the storage, during the processing of each instruction, of the address of a word of this instruction.

This circuit is designed for the implementation of the above method.

BRIEF DESCRIPTION OF THE INVENTION

Other features and advantages of the invention shall appear in the following description of a preferred, non-restrictive example of an embodiment, read in conjunction with the appended drawings, of which:

FIG. 1 is a drawing of an applications specific integrated circuit according to the invention;

FIG. 2 is a drawing of the part of the circuit of FIG. 1 that relates to the storage of the addresses of the first words of the instructions carried out;

FIGS. 3, 4 and 5 are timing diagrams illustrating the implementation, in the circuit of FIG. 1, of the method according to the invention;

FIG. 6 is a drawing of a part of the circuit of FIG. 1.

MORE DETAILED DESCRIPTION

Referring to FIG. 1, an integrated circuit 1 according to the invention made on a single silicon chip has a central processing unit 2 and a number of devices dependent on the application of the integrated circuit. For example, the integrated circuit 1 is dedicated to the processing of signals and the central processing unit 2 comprises the essential elements of a dedicated signal processor (DSP). The central processing unit 2 has a program control unit 3 and elements collectively referenced by one reference 4, these being elements such as a computation unit for example.

The circuit 1 has a program memory 5 (for example a read-only memory ROM) containing an application program and connected to the program control unit by means of an instruction address bus 11 and an instruction data bus 12.

This circuit could also comprise other memories 6 and 7 used, for example, to process data elements in parallel, each of these memories being connected to the program control unit 3 and to primary ports of the circuit 1, respectively by address buses 13 and 14 and data buses 15 and 16.

It could also be assumed that the memories 5, 6 or 7 form part of the central processing unit or else that they are external to the circuit 1.

Hereinafter, it shall be assumed that the working of the central processing unit is characterized by the execution of instructions of a program contained in the program memory 5.

The program control unit 3 has a program counter 8 to place location addresses of the program memory 5 on the instruction address bus 11 and a sequencer 9 to decode the data present on the instruction data bus 12.

To store or memorize the addresses of the first words of the instructions carried out by the program command unit, these words being stored in the program memory 5, the central processing unit 2 has an emulation unit 19. This emulation unit 19 has a storage or memorizing circuit 10 described in detail in FIG. 2.

In general, for reasons of simplicity, the buses of a given type in an integrated circuit (for example the address buses) have one and the same number n of wires (with n as an integer, typically n=8 or n=16). Thus, in the circuit 1, it is assumed that the address buses 11 and 13 have the same number n of wires.

The storage circuit 10 has an input port 28 to receive the lines of the instruction address bus 11, an output port 30 connected to the data bus 15, two output ports 34 and 35 connected to two input ports of a multiplexer 20 (each input port of the multiplexer 20 being actually formed by n inputs). This multiplexer 20 has a third input port to receive the lines of the instruction address bus 11. The storage circuit 10 furthermore receives a control signal (signal TONWNCY) from the program control unit at an input 29 and control signals (signals RS and DUMP) from an emulation control device 18 at two inputs 31 and 32.

Typically, the testing of a program implemented in a circuit, namely the emulation of this program, is controlled by the user by means of a testing device 25 external to the circuit. Finally, inter alia, to minimize the number of access terminals to the circuit, this circuit generally has internal circuits dedicated to emulation control, connected to the testing device by terminals providing access to the circuit.

Thus, in the circuit described, the emulation unit 19 has an emulation control device 18 that is connected to a testing device 25 external to the circuit 1 by means of one or more terminals 24.

The multiplexer 20 has an output port and receives three output control signals from the storage circuit (TOIA, TOPCD, TOPC) through three outputs 33 of this circuit for the selective connection of its output port to one of these input ports. The output port of the multiplexer 20 is connected to inputs of elementary cells of a shift register 17 formed by elementary cells (represented collectively by dashed boxes in the shift register) mounted on access lines of the program control unit (address bus 13 and 14, data bus 15 and 16, instruction data bus 12). This shift register 17 makes it possible conventionally (see EP A 0 578 540) to sample the values of the signals present at the access lines of the program control unit 3 or to set values on these lines.

The circuit 1 has a terminal 50 that corresponds to the series input of the shift register, a terminal 51 that corresponds to the series output of the shift register and input terminals collectively designated by the reference 52 to receive control signals designed for the cells of the register. The input and the output of the register are connected conventionally to the test device 25, this device giving the control signals designed for the cells of the register 17.

Finally, the emulation unit 19 has a storage register 22 having an input connected to the emulation control device 18 and an output connected to an input of a comparison circuit 21, this comparison circuit 21 having another input to receive the signal present at the output of a multiplexer 27 receiving, at input, the data buses 15 and 16 and being controlled by the emulation control device 19. This comparison circuit 21 has an output to give a command signal SNAP to the cells of the shift register 17 by means of a logic circuit 23, this logic circuit having an input to receive the control signal TONWNCY given to the input 29 of the storage circuit 10 by the program control unit 3.

FIG. 2 shows an exemplary embodiment of the storage circuit 10. Each wire of the input port 28 (which has n such ports) is connected respectively to the input of a latch circuit, the n latch circuits being represented, for purposes of readability, by a single latch L. This latch L formed by n parallel-connected latches has n outputs each connected to one input of a master-slave register. These n master-slave registers are, for purposes of readability, also shown collectively by one master-slave register R0, with n inputs and n outputs. Hereinafter in the description, unless otherwise stated, it will be assumed that the registers are master-slave registers with n inputs and n outputs formed in practice by n master-slave registers each having one input and one output.

The outputs of the register R0 are connected to a first input port of a multiplexer 36 (this port comprising n inputs of course). This multiplexer 36 has an output port connected to n inputs of a master-slave register R1.

The storage circuit 10 thus has p master-slave registers (with p as an integer >1) with n inputs and n outputs referenced R1 to Rp and series-connected, the n outputs of a register Ri (with i as an integer between 1 and p-1) being connected to the n inputs of the register Ri+1. In one example, p=6.

The n outputs of the last register Rp are connected to a second input port (with n inputs of course) of the multiplexer 36.

The latch circuit L receives a logic control signal /H such that the latch is transparent for /H=1 and blocked for /H=0. In practice, H is the complementary logic signal of a clock signal H produced for example by a quartz oscillator to synchronize the working of the integrated circuit 1, notably the addressing, decoding and performance of the instructions of the program contained in the program memory 5.

The master-slave registers R0 to Rp receive a shift logic control signal GO such that they carry out a sampling on the leading edge of this signal GO. Thus, given the propagation times in the registers, a stack is formed by means of the registers R1 to Rp such that, at each leading edge of GO, the contents of one register are transferred to the next register.

The signal GO is produced by the output of a two-input AND logic gate 37 that receives, at its two inputs, firstly the clock signal H and secondly a signal given by an output of a master-slave register 38 (with one input and one output). This master-slave register has its input connected to the output of a two-input OR logic gate 39 and receives the logic signal /H in such a way that it carries out a sampling on the leading edge of /H.

The OR gate 39 has one input connected to the input 32 of the storage circuit and its other input is connected to the output of an inverter 40 having its input connected to the input 29 of the storage circuit.

The input 29 receives the logic control signal TONWNCY from the program control unit 3.

The input 32 receives the logic control signal RS from the emulation control device 18.

The output of the inverter 40 is connected furthermore to the input of a master-slave register 42 (with one input and one output) carrying out a sampling on the leading edge of the clock signal H, the output of this register 42 being connected to an input of a master-slave register 43 (with one input and one output) carrying out a sampling also on the leading edge of the clock signal H.

The output of the master-slave register 43 is connected to:
- an input of a two-input AND gate 45 whose output gives the logic control signal TOPCD to the multiplexer 20 by means of one of the outputs 33 of the storage circuit 10,
- an input of an inverter 46 whose output is connected to an input of a two-input AND gate 47, the output of this AND gate 47 giving the logic control signal TOPC to the multiplexer 20 by means of one of the outputs 33 of the storage circuit.

At their other inputs, the AND gates 45 and 47 receive, from the emulation control device, the logic signal DUMP by means of the input 31 of the storage circuit 10.

Furthermore, the storage circuit has a tristate buffer circuit 41 having an input port and an output port, its input port having n inputs connected to the outputs of the first register R1 of the stack, its output port having n outputs connected to the lines of the address bus 13 (output port 30 of the storage circuit). The tristate buffer circuit 41 receives the logic control signal RS to selectively connect the outputs of the register R1 to the lines of the bus 13 or to isolate these outputs from the lines of this bus. The registers R2 and R3 of the stack each have their outputs connected to an input port of the multiplexer 20.

The operations for the addressing of the memory 5, decoding by the sequencer 9 and performance by the central processing unit are temporally synchronized by the clock signal H. For example, it will be assumed that the synchronization is done on the leading edge of this signal. Thus, if it is desired to carry out an instruction of one word and one cycle (a so-called one-cycle instruction, with one cycle corresponding to a period of the clock signal), the program counter 9 positions the address of the word on the instruction address bus on a leading edge of H. After a certain period of time, smaller than a cycle period of the clock signal H, the memory positions the word read at the address present on the bus 11. This word is decoded by the sequencer 9 from the leading edge of the next clock signal. Then, on the next leading edge, namely the one marking the start of the decoding of the word, the instruction (which has a word of one cycle) is carried out. The processing of the instruction is therefore done on three cycles, one for the addressing, one for the decoding and one for the performance. An instruction may require several memory access operations (to read several words). In this case, it is called a multicycle operation. An instruction may require an execution time that lasts several cycles but only one memory access operation (one word, m cycles, with m as an integer greater than 1). An instruction such as this will also be called a multicycle instruction. In the case of a multicycle instruction, the addressing of the word and its decoding are done on as many cycles as the performance of the instruction in order to ensure homogeneous temporal processing of the instructions that succeed each other.

As stated, the storage circuit is aimed at the storage, in the circuit, of the address of a word of each instruction when this instruction is carried out. This storage is done in the stack formed by the p master-slave registers R1 to Rp. At most therefore, p addresses corresponding to the last p instructions carried out are stored. This storage is temporary. Indeed, if more than p instructions are stored, they will gradually disappear from the stack through the register Rp. In practice, the number p will be fixed so that it enables the storage of a sufficient number of addresses to make it more or less certain that it will be possible, when the stack is read, to know where the operation is located in the program without in any way thereby occupying an excessively large area.

FIG. 3 shows the temporal progress of the stacking in the stack of the registers R1 to Rp.

The figure considers, for example, the carrying out of four instructions A, B, C, D such that:

A is a one-word, one-cycle instruction, the word encoding this instruction being referenced $D_{N-1}$ and being located at an address of the memory 3 referenced $A_{N-1}$.

B is a one-word, one-cycle instruction, the word encoding this instruction being referenced $D_N$ and being located at an address of the memory 3 referenced $A_N$.

C is a two-word, two-cycle instruction, each word implying one addressing, decoding and performance cycle. The words encoding the instruction C are referenced $D_{N+1}$ and $D_{N+2}$ and are located at two addresses referenced $A_{N+1}$ and $A_{N+2}$.

D is a two-word, four-cycle instruction. A first word $D_{N+3}$ requires one cycle for its processing and is located at an address $A_{N+3}$ and a second word $D_{N+4}$ requires three processing cycles and is located at an address $A_{N+4}$.

To carry out a series of instructions requiring q cycle periods in all for the execution, with q as an integer, the pipeline structure implies that the interval between the start of the addressing of the first word of the first instruction and the end of the performance of the last instruction has a duration of q+2 cycle periods since the start of the decoding of an instruction is lagged by one cycle period with respect to the start of its addressing and since the start of the performance of an instruction is lagged by one cycle period with respect to the start of its decoding. In the example below, the series A, B, C, D requires a duration of eight cycle periods in order to be performed and the end of the performance of the instruction D will therefore correspond to the end of the cycle H10, with Hj (j as a whole number) referencing the successive cycles and with H1 referencing the cycle corresponding to the presence of the address $A_{N-1}$ on the instruction address bus.

We therefore have the following temporal diagram:

H1: addressing of the word $D_{N-1}$ of the instruction

H2: decoding of A (one word), addressing of B (one

H3: performance of A, decoding of B, addressing of the first word of C,

H4: performance of B, start of the decoding of C, addressing of the second word of C, H5: start of the performance of C, end of the decoding of C, addressing of the first word of D, H6: end of the performance of C, start of the decoding of D, addressing of the second word of D, H7: start of the performance of D, H8: end of the addressing of D, H9: end of the decoding of D, 10: end of the performance of D.

to implement the invention, the address $A_{N-1}$ will be stored during the cycle H3 (instruction A), the address $A_N$ during the cycle H4 (instruction B), the address $A_{N+1}$ during the cycle H5 (instruction C), and the address $A_{N+3}$ during the cycle H7 (instruction D).

As we have seen, the latch L is transparent when /H =1, namely when H=0. This corresponds to the second half-cycle of the clock if it is assumed that the clock signal is high during a first half-cycle and then goes to the low state (the processing of the instructions is synchronized with the leading edge of the clock signal, the edge considered as marking the start of the cycle).

The addresses present at the instruction address bus will therefore be available at the output of the latch circuit L for a duration of one cycle period.

A detailed description shall now be given of the control signals needed for the working of the storage circuit.

The storage circuit receives the logic control signal TONWNCY from the program control unit. This signal is such that it is placed in the state 1 for a duration of q-1 cycle periods with q as a whole number for an instruction requiring q cycle periods, or else is placed in the state 0. Thus, assuming that the instructions, if any, that were decoded before A were of the one-cycle type, the signal TONWNCY is in the state 0 until the instant of the decoding of C, since it is at this time that the number of cycles needed for the performance of C is known. A certain delay has been taken into consideration between the start of the decoding of C and the passing to 1 of the signal TONWNCY. For example, with reference to the leading edge of the cycle H4, the signal TONWNCY goes to the state 1 at the end of a duration of a quarter cycle period and goes back to the state 0 at the end of a duration of a quarter of a cycle period after the leading edge of the next cycle H5.

The logic control signal RS, received from the emulation control device, is used to read the stack and it is assumed, for the time being, to be in the state 0 in such a way that the multiplexer 36 connects the input of the register R1 to the output of the register R0, called a stack input register.

Thus, the output of the OR gate 39 will follow the changes undergone by the signal /TONWNCY.

The master-slave register 38, latched on to the trailing edge of H, will therefore follow the changes undergone by /TONWNCY with a delay, which here is equal to a duration equal to a quarter of a cycle period.

So long as the output of this register 38 is in the state 1, the control signal GO which sets the shift in the registers of the stack and is produced by the AND gate 37 will follow the changes undergone by the clock signal H. If an instruction lasts several cycle periods, the signal GO will go to a permanent state 0 starting from the first trailing edge of H following the start of the decoding of this word and will do so until the start of the decoding of the next instruction.

Since the registers R0 to Rp latch on to the leading edges of GO, there will be the following temporal development:

H2: storage in R0 of $A_{N-1}$ at the start of the decoding of A,

H3: storage in R1 of $A_{N-1}$ at the start of the performance of A and storage in R0 of $A_N$ at the start of the decoding of B, H4 and H5: storage in R2 of $A_{N-1}$, storage in R1 of $A_N$ and storage in R0 of $A_{N+1}$, H6 to H9: storage in R3 of $A_{N-1}$, storage in R2 of $A_N$, storage in R1 of $A_{N+1}$, and storage in R0 of $A_{N+3}$.

Since the storage in the stack input register R0 is synchronized with the start of the decoding of the instructions, There is actually a storage in the stack that is synchronized with the performance of the instructions since the start of a performance of an instruction begins with one delay cycle period in relation to the decoding of this instruction.

The presence of the latch L is explained by the fact that an address is never positioned on the instruction address bus precisely at the rising edge of the clock signal but with a small delay, typically equal to about some nanoseconds. Otherwise a master slave register could have been placed instead of this latch: this approach, actually, is of little value since it would have taken up more space.

When it is desired to read the contents of the stack, the control signal RS is positioned at 1. The stack is then looped by means of the multiplexer 36 and the output of the first register R1 is connected to the data bus 15 by means of the buffer circuit 41.

On the next trailing edge of H, the signal at the output of the master-slave register 38 will go to the state 1. Then, starting from the next leading edge of H, the signal GO will start copying the signal H, gradually shifting the values stored in the stack from one register to the next register. The contents of R1, Rp, $R_{p-1}$, etc. will therefore gradually be found in the data bus 15. At the $p_{th}$ leading edge of Go, all the contents of the stack will be gradually placed on the bus 15.

The fact of going out by the first register of the stack makes it possible to be certain that the first value of the stack available on the bus 15 corresponds to an address of an instruction that has been carried out. This is so of course to the extent that, when the stack is read, a program has actually begun to be performed, the contrary case being of no utility.

The looping of the stack has another utility which is that it enables a return of the contents of the stack to a state known before reading if care is taken to produce as many shifts in the stack as the number of registers forming the stack. In this case, the reading of the stack will not affect the contents of the registers before reading.

The fact of sending out the contents of the stack on a data bus used furthermore by the circuit when the stack is not read makes it possible to get rid of the need for specific means dedicated to the transmission of these contents to the exterior. However, it is necessary for this bus to be accessible by an input/output port of the integrated circuit. It is possible to envisage a series output towards the exterior of the circuit. However, this would make it necessary to convert the contents of the registers of the stack in a parallel-series register for example, thus increasing the size of the circuit and slowing down the reading of the contents of the stack since it would be necessary to wait for the series output of the contents of each register before loading the contents of the next register.

FIGS. 4 and 5 show timing diagrams corresponding to a storage of the contents of a register of the stack in cells of the shift register H. This type of register may be used to sample the values of signals present on lines of a circuit (see EP 0 578 540). For the program test, such registers enable the sampling of these values without stopping the running of the program, by taking a sort of snapshot of the values of the signals present.

In practice, this sampling is produced by a particular event, for example the presence of a particular data element on a data bus and therefore follows the carrying out of an instruction of the program without its being necessarily possible to know the part of the program that has prompted the particular event.

The invention can be applied to special advantage in a snapshot mode of operation such as this. The invention can be used to retrieve the address of the first word of the instruction that has prompted the particular event by means of the stack.

In the exemplary embodiment proposed, the register of the stack containing the address of the first word of the instruction that has prompted the event will be either the second or the third register of the stack.

The multiplexer 20 connects its output port to one of its three input ports when a control signal corresponding to this input is in a given logic state (here the state 1), each input having an associated control signal (TOIA, TOPCD, TOPC), and a single signal being in the state 1 at a time. If TOIA=1, the output port of the multiplexer 20 is connected to the instruction address bus. If TOPCD=1, this port is connected to the outputs of the register R3. It TOPC=1, this port is connected to the inputs of the register R2.

The signal DUMP, when it is at 1, enables the connection of the output of the multiplexer 20 either to the output of the register R2 or to the output of the register R3. When it is at 0, the cells of the shift register connected to the output of the multiplexer are connected to the instruction address bus, thus permitting a standard use of the shift register such as the enforcing of an address on this bus from the exterior of the circuit.

According to what has been described here above, it can clearly be seen that, to determine the register of the stack in which the address of the first word that has prompted the event is stored, it is necessary to take account of the number of cycles needed to carry out the next instruction. Indeed, it is desired not to interrupt the running of the program and, consequently, it is possible that instructions could have been performed after the one that has prompted the event, and could therefore have been stored (by means of the address of their first word) in the stack.

It is assumed that, in a standard way, the sampling in the cells is controlled by a logic control signal SNAP. The cells are not described as, besides, this type of cell is widely known.

A signal SNAP is produced such that the sampling occurs on a trailing edge of the signal SNAP, this being done:
after the performance of the instruction following the one that has prompted the event, if this instruction is a multicycle instruction,
after the performance of the second instruction following the instruction that has been prompted the event, if the instruction following the one that has prompted the event is a one-cycle instruction.

In the former case, the register of the stack containing the useful address is the last register of the stack. In the latter case, it is of course the third register of the stack.

FIG. 4 illustrates the former case.

It is assumed that an instruction A has caused the event, this instruction A being followed by an instruction B having a duration of four cycles. It is assumed furthermore that the instruction A is a one-cycle instruction encoded by a word $D_N$ at an address $A_N$ in the program memory.

Letting Hi reference the cycle corresponding to the positioning of the address $A_N$ on the instruction address bus, the instruction A will be decoded during the next cycle H2 and then carried out during the cycle H3.

The instruction B will be addressed during the cycles H2 to H5, decoded during the cycles H3 to H6 and carried out during the cycles H4 to H7.

The contents of the register R2 will therefore be sampled at the start of the cycle H8.

The event occurs after the performance of the instruction A. For example, this instruction will have prompted the positioning of a particular data element on the data bus 15, this bus being connected to the input of the comparator 21. This comparator compares the signal conveyed by this bus with the contents of the register 22 in such a way that it goes to the state 1 if the values are equal and does so during one cycle.

The output signal of the comparator is combined with the signal TONWNCY in the logic block 23 illustrated in FIG. 6.

This logic block has first, second and third master-slave registers, respectively referenced 48, 49 and 51, with one input and one output. It furthermore has a multiplexer 50 with three inputs and one output. A first input of the multiplexer receives a logic signal with a permanent state 1. A second input of this multiplexer receives a logic signal with a permanent state 0. The third input of the multiplexer 50 is connected to the output of the register 51, and this register latches on to the leading edge of the clock signal H.

The first master-slave register 48 has its input connected to the output of the comparator 21. Its output is connected to the multiplexer 50 in such a way that it connects the output of the multiplexer to its first input if the output signal of the register 48 is in the state 1.

The second master-slave register 49 has its input connected to the output of an inverter 52 receiving TONWNCY at input. Its output is connected to the multiplexer 50 in such a way that it connects the output of the multiplexer to its second input if the output signal of the register 49 is in the state 1.

The first and second master-slave registers 48 and 49 latch on to the leading edge of the clock signal /H.

The multiplexer 50 receives a third control signal OC to connect the output to its third input if the signals delivered by the master-slave registers 48 and 49 are in the state 0.

A case where the instruction (B) following the instruction (A) that has prompted the expected event is a multicycle instruction (FIG. 4):
  one cycle period after the instruction A has been carried out, the signal SNAP goes to 1,
  two cycle periods after the return to the state 0 of the signal TONWNCY, the signal SNAP goes to 0, prompting the sampling of the contents of the register R2 in the cells of the shift register.

A case where the instruction (B) following the instruction (A) that has prompted the expected event is a one-cycle instruction (FIG. 5):
  one cycle period after the performance of the instruction A, the signal SNAP goes to 1,
  one cycle period later, it goes to 0, prompting the sampling of the contents of the register R3 in the cells of the shift register.

In the former case, there is a change in the selection of the inputs of the multiplexer 20 for, so long as TONWNCY is at 0, it is the outputs of the register R3 that are connected to the cells of the shift register (TOPCD=1).

The value of the invention in the context of a snapshot type of mode of operation can be seen clearly. It is enough for the test device to receive the signal SNAP by means of a terminal of the circuit for it to be known that a sampling has taken place in the shift register. It is then enough to carry out the series output of the contents of the cells of the register to know the position, in the program, of the instruction that has prompted the event causing the sampling.

In the embodiment described, it will be noted that, in the snapshot type mode of operation, the values of the signals present at the instruction address bus are not sampled. These values are not really important inasmuch as they correspond to the address of an instruction that has not yet been carried out. It is nevertheless possible to use two series of cells in the register to sample, firstly, the value of the signals of this bus and, secondly, the contents of one of the registers of the stack in which case only a multiplexer 20 with two input ports will be used. The output and the input of values into the shift register, which has a greater number of cells, will then be slowed down.

Although the invention has been described with reference to a preferred exemplary embodiment, it will be understood that this example is not restrictive and that several modifications may be made thereto without departing from the framework of the invention.

What is claimed is:

1. A method to test the running of a program of instructions carried out by an applications specific integrated circuit comprising a central processing unit and devices dependent on the application of the circuit, these devices including at least one program memory having a program of instructions to be carried out, each instruction having one or more words and lasting one or more cycles, each word being stored at a location of the memory, the method comprising the steps of successively:
  positioning, by using a program counter, the address of the word or of the successive addresses of the words of the instruction on an n-bit instruction address bus, n being an integer, connecting the central processing unit to the program memory,
  positioning, by the program memory, after reading of each word, of this word on an instruction data bus connecting the central processing unit to the memory,
  decoding of the words by a sequencer of the central processing unit, and
  carrying out of the instruction by the central processing unit:
  wherein, for each instruction, the address of a word of this instruction is stored in the integrated specific integrated circuit during the processing of the instruction and may be read during the processing of this instruction;
  Wherein the address is stored in one register among p parallel-parallel registers with n inputs and n outputs, with p as an integer, series-connected so as to from a stack and connected to the address bus by means of n latch circuits and one parallel-parallel stack input register with n inputs and n outputs; and
  wherein at least one instruction lasts more than one cycle.

2. A method according to claim 1, wherein the word to be stored is stored at the time of the performance of the instruction that the address is representative of.

3. A method according to one of the claim 1, wherein the stored address is the address of the first word of the instruction.

4. A method according to claim 1, wherein to store an address:
  the address is stored in the latch circuits when it is present on the address bus,
  the address is stored in the stack input register when it is decoded, and
  the address is stored in the stack when the instruction that the address is representative of is carried out.

5. A method according to claim 1, wherein the inputs of the first register of the stack are connected selectively by means of a multiplexer to the outputs of the stack input register or to the outputs of the last register of the stack.

6. A method according to claim 1, wherein the reading of the contents of the stack is done from the outputs of one of the registers of the stack, the inputs of the first register being connected to the outputs of the last register of the stack, the contents of the registers being successively transferred from one register to the next register.

7. A method according to claim 6, wherein the reading of the contents of the stack is done from the outputs of the first register of the stack.

8. A method according to claim 6 wherein, during the reading of the stack, the outputs of the register used for the reading are connected to a bus accessible from the exterior of the integrated circuit.

9. A method according to claim 8, wherein the bus used to read the contents of the stack is an n-bit data bus.

10. A method according to claim 1, wherein the application specific integrated circuit has means for storing, in a particular mode, in a shift register formed by elementary cells, each mounted on the lines of the application specific integrated circuit, the state of these lines when the performance of an instruction prompts a particular event.

11. A method according to claim 10, wherein the contents of the register of the stack corresponding to the address representative of the instruction that has prompted the event are stored in elementary cells of this shift register.

12. A method according to claim 11, wherein the elementary cells in which there are stored the contents of the register containing the address representative of the instruction that has prompted the event are connected to the lines of the instruction address bus when the particular mode is not selected.

13. A method according to claim 11, wherein the contents of the second register of the stack are stored in the shift register if the instruction following the one that has prompted the particular event is a multicycle event, and wherein the contents of the third register of the stack are stored in the shift register if the instruction following the one that has prompted the event is a one-cycle instruction.

14. A method according to claim 1, wherein the stack contains six registers.

15. An applications specific integrated circuit, comprising:
a central processing unit; and
devices dependent on the application of the application specific circuit;
wherein these devices include at least one program memory;
wherein the program memory includes a program of instructions to be carried out, each instruction having one or more words and lasting one or more cycles, and each word being stored at an address location in the program memory;
wherein the application specific circuit further comprises
address positioning circuits for positioning, by using a program counter, the address of the word or of the successive addresses of the words of the instruction on an n-bit instruction address bus, n being an integer, connecting the central processing unit to the program memory;
data positioning circuits for positioning, by using the program memory, after the reading of each word, this word on an instruction data bus connecting the central processing unit to the memory;
decoding circuits for decoding the words by a sequencer of the central processing unit;
execution circuits for carrying out the instruction by the central processing unit; and
storage means arranged for storing, during the processing of each instruction, the address of a word of this instruction and may be read during the processing of this instruction;
wherein said storage means comprises p parallel-parallel registers with n inputs and n outputs, with p as an integer, series connected so as to form a stack and connected to the address bus by means of n latch circuits and one parallel-parallel stack input register with n inputs and n outputs; and
wherein at least one instruction lasts more than one cycle.

16. The application specific circuit according to claim 15, wherein the storage means are arranged so that the address of the word is stored at the time of the performance of the instruction that the address is representative of.

17. The application specific circuit according to claims 15, wherein the storage means are arranged in such a way that, for each instruction, the stored address is the address of the first word of the instruction.

18. The application specific circuit according to claim 15, wherein the inputs of the first register of the stack are connected selectively by means of a multiplexer to the outputs of the stack input register or to the outputs of the last register of the stack.

19. The application specific circuit according to claim 15, comprising means to connect the outputs of a register of the stack to a bus accessible from the exterior of the integrated circuit.

20. The application specific circuit according to claim 15, comprising a shift register and means for the memorizing, in a particular mode, in this shift register formed by elementary cells mounted on lines of the integrated circuit, of the state of these lines when the performance of an instruction prompts a particular event.

21. The application specific circuit according to claim 20, comprising means to connect the outputs of the register of the stack, whose contents correspond to the address representative of the instruction that has prompted the event, to elementary cells of this shift register.

22. The application specific circuit according to claim 15, wherein the stack contains six registers.

* * * * *